United States Patent
Scrbak et al.

(10) Patent No.: US 11,726,783 B2
(45) Date of Patent: Aug. 15, 2023

(54) FILTERING MICRO-OPERATIONS FOR A MICRO-OPERATION CACHE IN A PROCESSOR

(71) Applicant: Advanced Micro Devices, Inc., Santa Clara, CA (US)

(72) Inventors: Marko Scrbak, Austin, TX (US); Mahzabeen Islam, Austin, TX (US); John Kalamatianos, Arlington, MA (US); Jagadish B. Kotra, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 57 days.

(21) Appl. No.: 16/856,832

(22) Filed: Apr. 23, 2020

(65) Prior Publication Data

US 2021/0334098 A1    Oct. 28, 2021

(51) Int. Cl.
*G06F 9/38* (2018.01)
*G06F 9/26* (2006.01)
*G06F 16/901* (2019.01)
*G06F 12/0893* (2016.01)

(52) U.S. Cl.
CPC .............. *G06F 9/264* (2013.01); *G06F 9/262* (2013.01); *G06F 9/3808* (2013.01); *G06F 9/3887* (2013.01); *G06F 12/0893* (2013.01); *G06F 16/9017* (2019.01)

(58) Field of Classification Search
CPC ......... G06F 9/262; G06F 9/264; G06F 9/3808
See application file for complete search history.

(56) References Cited

U.S. PATENT DOCUMENTS

| | | | | |
|---|---|---|---|---|
| 7,062,607 B2* | 6/2006 | Solomon | ............... | G06F 9/3802 711/118 |
| 7,149,883 B1* | 12/2006 | Hammarlund | ........ | G06F 9/3017 712/245 |
| 7,694,110 B1* | 4/2010 | Alsup | ..................... | G06F 9/384 712/211 |
| 2002/0095553 A1* | 7/2002 | Mendelson | ........... | G06F 9/3802 711/118 |
| 2003/0009620 A1* | 1/2003 | Solomon | ............... | G06F 1/3243 711/118 |

(Continued)

OTHER PUBLICATIONS

Jimenez et al., Multiperspective Reuse Prediction, Oct. 2017.
(Continued)

*Primary Examiner* — Jacob Petranek
(74) *Attorney, Agent, or Firm* — Park, Vaughan, Fleming & Dowler LLP

(57) ABSTRACT

A processor includes a micro-operation cache having a plurality of micro-operation cache entries for storing micro-operations decoded from instruction groups and a micro-operation filter having a plurality of micro-operation filter table entries for storing identifiers of instruction groups for which the micro-operations are predicted dead on fill if stored in the micro-operation cache. The micro-operation filter receives an identifier for an instruction group. The micro-operation filter then prevents a copy of the micro-operations from the first instruction group from being stored in the micro-operation cache when a micro-operation filter table entry includes an identifier that matches the first identifier.

20 Claims, 7 Drawing Sheets

(56) References Cited

U.S. PATENT DOCUMENTS

2011/0252408 A1* 10/2011 Tzoref ................ G06F 11/3471
717/131
2015/0100763 A1* 4/2015 Holm .................... G06F 9/3017
712/210
2017/0293565 A1* 10/2017 Priyadarshi ........... G06F 12/126

OTHER PUBLICATIONS

Khan et al., Sampling Block Prediction for Last-Level Caches, Dec. 2010.
Lai et al, Dead-Block Prediction & Dead-Block Correlating Prefetchers, May 2001.
Rotenberg et al., Trace Cache: A Low Latency Approach to High Bandwidth Instruction Fetching, Apr. 1996.
Solomon et al, Micro-Operation Cache: A Power Aware Frontend for Variable Instruction Length ISA, Aug. 2001.

* cited by examiner

MICRO-OPERATION
CACHE ENTRY
304

MICRO-OPERATION
FILTER TABLE ENTRY
316

EVICTION HISTORY
TABLE ENTRY
322

FILTERING MICRO-OPERATIONS FOR A MICRO-OPERATION CACHE IN A PROCESSOR

GOVERNMENT RIGHTS

This invention was made with government support under the PathForward Project with Lawrence Livermore National Laboratory (prime contract no. DE-AC52-07NA27344, subcontract no. B620717) awarded by the Department of Energy (DOE). The government has certain rights in this invention.

BACKGROUND

Related Art

In some electronic devices, processors execute program code instructions—or, more simply, instructions—that cause the processors to perform corresponding operations. For example, a processor such as a central processing unit (CPU) may execute instructions from a software application, an operating system, firmware, etc. Some of the processors are able to execute a number of different instructions, or "macro-instructions," that are decoded by the processors into one or more micro-operations. Each micro-operation is a simpler, low-level processor instruction that, when executed by the processor, causes the processor to perform a respective part of the overall operation(s) of the instruction from which the micro-operation was decoded. For example, a single-instruction, multiple-data (SIMD) instruction may be decoded by a processor into a number of separate micro-operations for performing an operation of the SIMD instruction on multiple pieces of data.

When executing instructions in a processor, the operations of fetching instructions to be executed from an instruction cache (or elsewhere in a memory subsystem) and decoding the fetched instructions into micro-operations for execution take a relatively long time and consumes significant energy. Designers have therefore proposed techniques for speeding up the acquisition of micro-operations from instructions. Among of the techniques is using a cache memory, called a micro-operation cache, for saving copies of micro-operations that are decoded from instructions. For this technique, along with forwarding micro-operations decoded from instructions to execution units in the processor for execution, the processor saves copies of the micro-operations in the micro-operation cache. Upon again encountering instructions for which copies of micro-operations are stored in the micro-operation cache, the processor is able to acquire the micro-operations from the micro-operation cache instead of re-fetching and re-decoding the instructions. Due to the type of circuitry in the micro-operation cache and physical location of the micro-operation cache (nearer to the execution units), acquiring micro-operations from the micro-operation cache is significantly faster than re-fetching and re-decoding instructions.

Although benefits may be gained using micro-operation caches, micro-operation caches can be used inefficiently. Generally, micro-operation caches are lower-capacity cache memories that can hold only a small subset of all of the micro-operations that were previously decoded from instructions at any given time (noting that the micro-operations into which instructions are decoded can require more storage in bytes than the instructions themselves). It is common, therefore, for the micro-operation cache to become full of micro-operations. Once the micro-operation cache is full, in order for any subsequently decoded micro-operations to be stored in the micro-operation cache, existing micro-operations must be evicted from the micro-operation cache to free space for storing the subsequently decoded micro-operations. Inefficiencies in the use of the micro-operation cache can occur when micro-operations that will not be accessed, or "dead on fill" micro-operations, are stored in the micro-operation cache. The inefficiencies occur because useful micro-operations may be evicted from the micro-operation cache to free space in the micro-operation cache for storing the dead on fill micro-operations. When respective instructions are again executed, therefore, the respective instructions must be re-fetched and the useful micro-operations re-decoded, which takes a relatively long time and consumes additional energy. In addition, re-fetching and re-decoding the respective instructions causes unnecessary consumption of memory system bandwidth and decoding resources, as well as needlessly consuming electrical power.

BRIEF DESCRIPTION OF THE FIGURES

Throughout the figures and the description, like reference numerals refer to the same figure elements.

DETAILED DESCRIPTION

Figure 1:
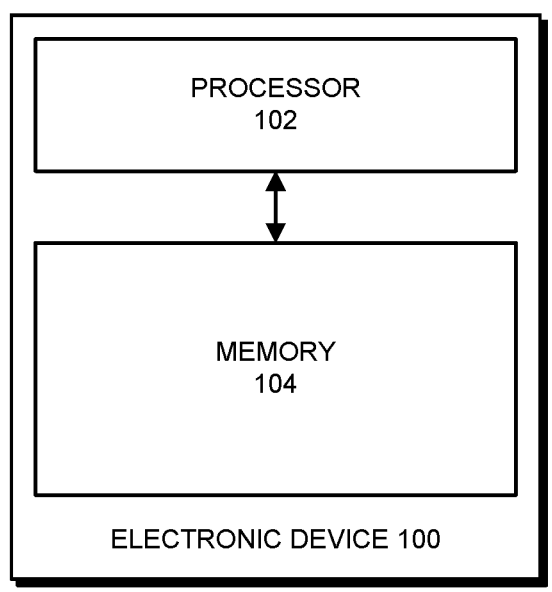
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of some of these terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified functions (e.g., computational or processing functions, memory functions, etc.), may be controlled by a common control element and/or a common clock, etc. The circuitry of a functional block can have any number of circuit elements, from a single circuit element (e.g., a single integrated circuit logic gate or discrete circuit element) to millions or billions of circuit elements (e.g., an integrated circuit memory).

Instruction group: instructions can be fetched by a processor from a instruction cache memory or elsewhere in a memory subsystem in instruction groups that include one or more instructions to be handled in the processor (e.g., for decoding and execution). In other words, the processor can fetch instruction groups of, or up to, N bytes in size from the memory subsystem, with N being any size such as, for example, 20 bytes, 64 bytes, or 100 bytes. For example, the processor may fetch, as an instruction group, half of the instructions in a cache line in the instruction cache memory. In some cases, each instruction group, and thus the one or more instructions therein, is associated with an identifier that is used by the processor for identifying the instruction group. For example, some or all of a memory address of a first instruction of the instruction group can be used as the identifier for the instruction group.

Overview

In the described embodiments, an electronic device includes a processor (e.g., a central processing unit, graphics processing unit, etc.) that has processing circuitry for executing instructions from program code. The processor also has a fetch unit that includes circuitry for fetching instruction groups from an instruction cache in the processor (or elsewhere in a memory subsystem) and a decode unit that includes circuitry for decoding instructions in the fetched instruction groups into micro-operations for execution by the processing circuitry. The processor additionally has a micro-operation cache that includes circuitry for storing copies of micro-operations to be used for subsequently re-executing respective instruction groups without re-fetching and re-decoding the respective instruction groups. The processor further has a micro-operation filter that includes circuitry for controlling which micro-operations are to be stored in the micro-operation cache—thereby "filtering" the micro-operations to be stored in the micro-operation cache.

In some embodiments, the micro-operation filter keeps (or accesses) records that identify instruction groups for which micro-operations are predicted not to be accessed if stored in the micro-operation cache. Such micro-operations can be considered as being predicted to be "dead on fill" because the micro-operations are predicted to be "dead," and thus not accessed, if they are stored (or "filled") in the micro-operation cache. Based on information in the records, the micro-operation filter "bypasses" predicted dead on fill micro-operations. Bypassing the micro-operations means that, because the micro-operations are identified in the records as being predicted dead on fill, a copy of the micro-operations is not stored in the micro-operation cache. In contrast, for micro-operations that are not identified in the records as being predicted dead on fill, the micro-operation filter stores a copy of the micro-operations in the micro-operation cache. The micro-operation filter therefore filters micro-operations to be stored in the micro-operation cache by preventing predicted dead on fill micro-operations from being stored in the micro-operation cache.

In some embodiments, the above-described records that identify instruction groups for which micro-operations are predicted dead on fill are kept in a micro-operation filter table. The micro-operation filter table includes circuitry for a number of entries, each entry configured for storing identifiers of instruction groups for which the micro-operations are predicted dead on fill. During operation of the processor, as identifiers for instruction groups are generated (e.g., by a next program counter functional block in the processor), the micro-operation filter determines whether any of the entries in the micro-operation filter table include identifiers that match the generated identifiers. If so, and thus if the micro-operations from the respective instruction groups are predicted dead on fill, the micro-operation filter bypasses the micro-operations as described above.

In some embodiments, identifiers of instruction groups for which the micro-operations are predicted dead on fill are added to the micro-operation filter table in a three-step process. For the first step in the process, the micro-operation cache keeps track of whether micro-operations stored in micro-operation cache entries are accessed while stored in the micro-operation cache. For example, the micro-operation cache may use a separate accessed indicator for each micro-operation cache entry for keeping a record of whether or not micro-operations stored in that micro-operation cache entry have been accessed.

In some embodiments, the second step in the process of adding identifiers of instruction groups to the micro-operation filter table involves an eviction history table. The eviction history table includes circuitry for a number of entries, each entry configured for storing identifiers of instruction groups for which the micro-operations were dead on fill in the micro-operation cache. For the second step in the process, when micro-operations that are recorded as not having been accessed are evicted from a micro-operation cache entry, the micro-operation cache informs the micro-operation filter that the micro-operations were dead on fill. The micro-operation filter then updates an eviction history table entry with an identifier of an instruction group from which the dead on fill micro-operations were decoded. For updating the eviction history table entry, when the identifier of the instruction group is not already stored in an eviction history table entry, the micro-operation filter finds an available entry (which may mean evicting existing information from an entry), updates the available entry with the identifier of the instruction group, and sets a confidence counter for the available entry to an initial value. On the other hand, when the eviction history table already includes an eviction history table entry with the identifier of the instruction group, the micro-operation filter increments a confidence counter for that entry. In this way, the micro-operation filter keeps, in the confidence counter, a count that indicates how many times micro-operations from the instruction group were found to be dead on fill in the micro-operation cache.

In some embodiments, for the third step in the process of adding identifiers of instruction groups to the micro-operation filter table, the micro-operation filter uses the confidence counters from the eviction history table to determine micro-operations that are predicted dead on fill in the micro-operation cache and adds identifiers for respective instruction groups to the micro-operation filter table accordingly. For this operation, when incrementing a confidence counter for an eviction history table entry causes the confidence counter to exceed a threshold value, and thus the micro-operations for an instruction group for which an identifier is stored in the eviction history table entry were found to be dead on fill in the micro-operation cache more than a specified number of times, the micro-operation filter predicts that the micro-operations will continue being dead on fill in the micro-operation cache. The micro-operation filter therefore stores an identifier for the instruction group in an available micro-operation filter table entry (which may mean evicting existing information from the micro-operation filter table entry). By storing the identifier for the instruction group in the micro-operation filter table entry, the micro-operation filter records that the micro-operations are predicted dead on fill in the micro-operation cache.

In some embodiments, the micro-operation filter includes mechanisms for ensuring that information in the micro-operation filter table does not become stale—and is thus more likely to remain correct. The mechanisms include a local counter in or associated with each micro-operation filter table entry. The micro-operation filter sets a local counter to a specified local counter value as an identifier for an instruction group is stored in a micro-operation filter table entry. The micro-operation filter next decrements the local counter each time that micro-operations from the instruction group are bypassed based on finding the identifier in the micro-operation filter table entry. The micro-operation filter then invalidates the micro-operation filter table entry when the local counter reaches zero. The micro-operation filter therefore uses information in each individual micro-operation filter table entry only a specified number of times before discarding the information from that micro-operation filter table entry.

In some embodiments, the mechanisms for ensuring that the information in the micro-operation filter table does not become stale include a global counter in or associated with the micro-operation filter table. For using the global counter, the micro-operation filter sets the global counter to zero when all micro-operation filter table entries are invalid prior to storing identifiers for instruction groups in the micro-operation filter table entries. For example, the micro-operation filter can set the global counter to zero at startup or after the micro-operation filter table entries have been invalidated or reset. The micro-operation filter next increments the global counter each time the micro-operations from any instruction group are bypassed based on the identifier being found in a respective micro-operation filter table entry. The micro-operation filter then invalidates all of the micro-operation filter table entries when a value of the global counter exceeds a reset threshold value. The micro-operation filter therefore uses information in all of the micro-operation filter table entries as a group only a specified number of times before discarding the information in all of the micro-operation filter table entries as a group.

By bypassing micro-operations as described above, the described embodiments avoid storing micro-operations that are predicted to be dead on fill in the micro-operation cache. Avoiding storing dead on fill micro-operations in the micro-operation cache can improve the operation of the micro-operation cache by not causing the eviction of useful micro-operations from the micro-operation cache to free space for storing the dead on fill micro-operations. Because useful micro-operations remain in the micro-operation cache, the processor can more rapidly acquire the useful micro-operations for re-execution (in contrast to re-fetching and re-decoding instructions from a respective instruction group). Also, because useful micro-operations remain in the micro-operation cache, electrical power and resource consumption associated with re-fetching and re-decoding instruction groups for evicted useful micro-operations can be reduced. In addition, a memory subsystem in the processor can operate more efficiently because the useful micro-operations remain in the micro-operation cache, reducing the re-fetching of instruction groups. The improvement in the operation of the micro-operation cache, memory subsystem, and fetch and decode units can contribute to the improved operation of the processor and the electronic device, which leads to increased user satisfaction.

Electronic Device

FIG. 1 presents a block diagram illustrating electronic device 100 in accordance with some embodiments. As can be seen in FIG. 1, electronic device 100 includes processor 102 and memory 104. Generally, processor 102 and memory 104 are implemented in hardware, i.e., using circuitry. For example, the circuitry for processor 102 and memory 104 can be entirely fabricated on one or more semiconductor chips, including on one or more separate semiconductor chips, can be fabricated from one or more semiconductor chips in combination with discrete circuit elements, or can be fabricated from discrete circuit elements alone. As described herein, processor 102 and memory 104 perform operations for bypassing predicted dead on fill micro-operations for a micro-operation cache.

Processor 102 is a functional block that performs operations associated with executing instructions from program code, such as instructions from software applications, firmware, operating systems, scripts, etc., as well as other operations (e.g., control, memory access, input-output, etc.). Processor 102 includes one or more central processing unit (CPU) cores, graphics processing unit (GPU) cores, embedded processors, application specific integrated circuits (ASICs), and/or other functional blocks that execute the instructions from program code and/or perform the other operations.

Memory 104 is a functional block that performs operations of a memory (e.g., a "main" memory) in electronic device 100. Memory 104 includes memory circuits for storing instructions, information, and data for access by functional blocks in electronic device 100, as well as control circuits for handling accesses of data in the memory circuits. The memory circuits in memory 104 include volatile memory circuits such as double data rate synchronous dynamic random access memory (DDR SDRAM), static random access memory (SRAM), and/or other types of memory circuits. In some embodiments, memory 104 is coupled to a non-volatile mass storage device that functions as long-term storage for instructions and/or data (e.g., a disk drive or solid state drive) (not shown).

Electronic device 100 is shown as including a particular number and arrangement of elements (i.e., processor 102 and memory 104) for illustrative purposes. In some embodiments, however, a different number or arrangement of elements is present in electronic device 100. For example, electronic device 100 can include power subsystems, networking subsystems, human interface systems, etc. Generally, electronic device 100 includes sufficient elements to perform the operations described herein.

Electronic device 100 can be, or can be included in, any electronic device that performs operations for executing instructions as described herein. For example, electronic device 100 can be, or can be included in, electronic devices such as desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Processor

Figure 2:
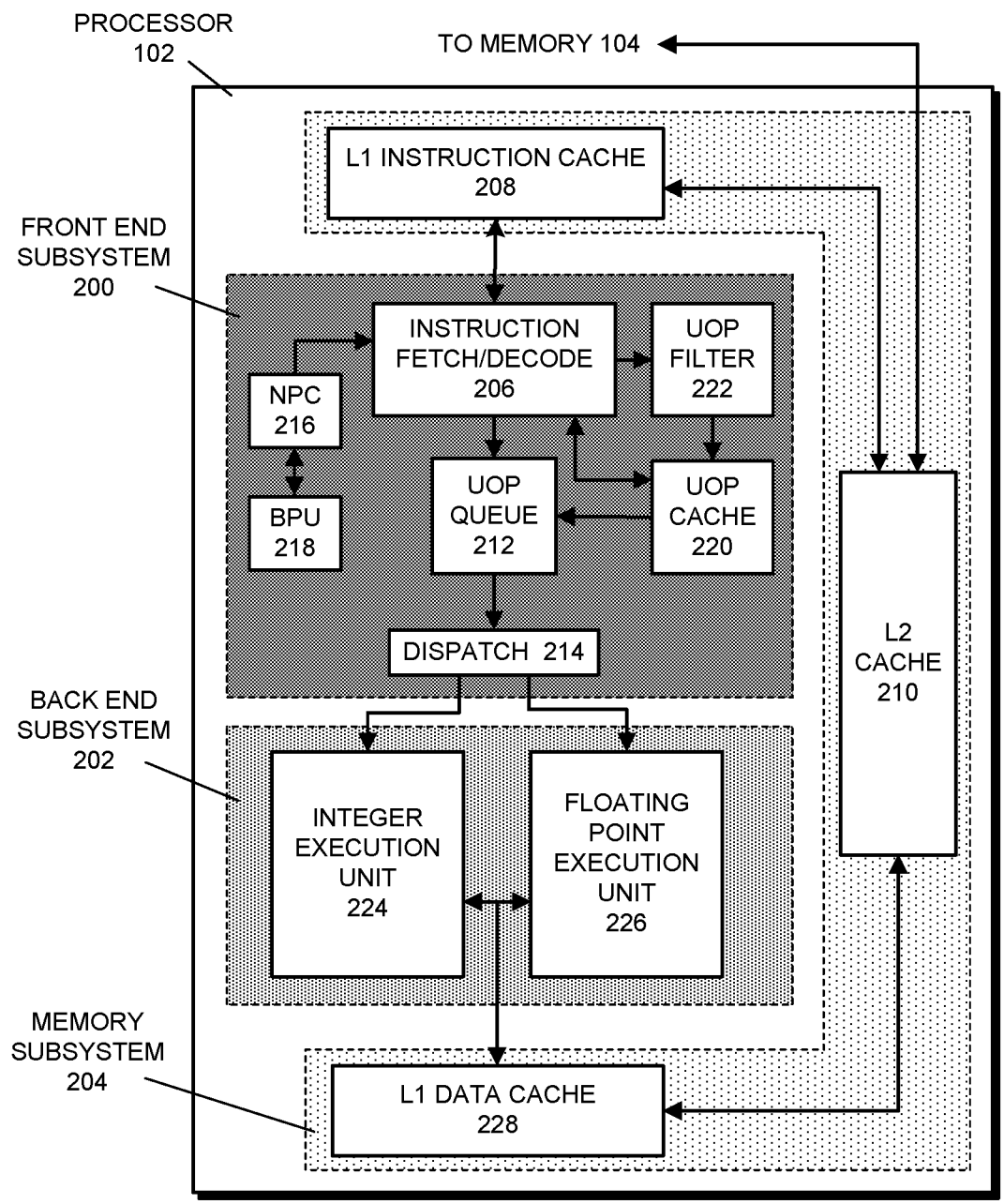
FIG. 2 presents a block diagram illustrating a processor in accordance with some embodiments.

As described above, electronic device 100 includes processor 102. FIG. 2 presents a block diagram illustrating processor 102 in accordance with some embodiments. As shown in FIG. 2, the functional blocks in processor 102 can be considered as part of front end subsystem 200, back end subsystem 202, or memory subsystem 204. Generally, front end subsystem 200 includes functional blocks that perform operations for acquiring instructions from memory subsystem 204 and generating micro-operations from the instructions that are sent to execution units in back end subsystem 202 for execution.

Front end subsystem 200 includes instruction fetch/decode 206, which is a functional block that includes circuitry that performs operations associated with fetching instructions and decoding fetched instructions into micro-operations in preparation for executing the micro-operations. Instruction fetch/decode 206 fetches (i.e., requests and receives) instruction groups of instructions from L1 instruction cache 208—or L2 cache 210 or memory 104, if necessary. Instruction fetch/decode 206 then decodes instructions in the fetched instruction groups into respective micro-operations. Instruction fetch/decode 206 forwards the micro-operations to micro-operation (UOP) queue 212, which is a functional block that includes circuitry for controlling when and how micro-operations are fed from front end subsystem 200 to back end subsystem 202. From micro-operation queue 212, micro-operations are eventually fed to dispatch 214, which is a functional block that includes circuitry for steering or directing micro-operations to appropriate execution units in back end subsystem 202 for execution.

Front end subsystem 200 also includes next PC (NPC) 216, which is a functional block that includes circuitry that performs operations for determining an address in memory, or "program counter," for a next instruction group to be fetched from L1 instruction cache 208 for execution. Next PC 216, based on an initial or current value of the program counter, computes a next sequential value for the program counter. For example, given 32-byte instruction groups, next PC 216 may compute next address=current address+32 bytes. When program/instruction flow is not changed by control transfer instructions (e.g., branch instructions, etc.), front end subsystem 200 uses the sequential values of the program counter that are computed by next PC 216 for fetching instruction groups from corresponding sequential addresses in memory.

Front end subsystem 200 additionally includes branch prediction unit (BPU) 218, which is a functional block that includes circuitry that performs operations for predicting the resolutions of control transfer instructions (e.g., branches, etc.) in instruction groups and modifying the program counter—and thus the address in memory from which subsequent instruction groups are fetched. In other words, branch prediction unit 218, using one or more records of control transfer instruction behavior, predicts a "taken" or "not-taken" resolution of control transfer instructions and provides a predicted target address for taken control transfer instructions. When a control transfer instruction is predicted taken by branch prediction unit 218, branch prediction unit 218 may replace a next or subsequent program counter provided by next PC 216 with a target address for the control transfer instruction.

Front end subsystem 200 further includes micro-operation (UOP) cache 220, which is a functional block that includes circuitry that is used for storing copies of previously decoded micro-operations to be used for subsequently re-dispatching and executing respective instruction groups without again fetching and decoding the respective instruction groups. When instructions in instruction groups are decoded into micro-operations by instruction fetch/decode 206, copies of the micro-operations can be stored in micro-operation cache 220. The copies of the micro-operations that are stored in micro-operation cache 220 can then be used to quickly acquire the micro-operations during subsequent re-execution(s) of the instruction group. More specifically, when next PC 216 provides an address for a next instruction group to be fetched and executed, micro-operation cache 220 receives the address and determines if a copy of micro-operations for the instruction group is stored in micro-operation cache 220. If so, micro-operation cache 220 forwards the copy of the micro-operations to micro-operation queue 212, from where the micro-operations are fed to dispatch 214 and back end subsystem 202 for execution. Micro-operation cache 220 can also send an indication to instruction fetch/decode 206 that the micro-operations were provided from micro-operation cache 220 and instruction fetch/decode 206 therefore does not need to fetch and decode the instructions in the instruction group. Instruction fetch/decode 206 can therefore terminate the fetch and/or decode of the instruction group.

Front end subsystem 200 further includes micro-operation filter 222, which is a functional block that includes circuitry that performs operations for controlling which micro-operations are stored in micro-operation cache 220. Micro-operation filter 222 uses records that identify instruction groups that are predicted not to be accessed if stored in micro-operation cache 220 to determine micro-operations that are to be bypassed—and thus not stored in micro-operation cache 220. Micro-operation filter 222 and the records used thereby are described in more detail below.

Back end subsystem 202 includes integer execution unit 224 and floating point execution unit 226, which are functional blocks that include circuitry that perform operations for executing integer and floating point micro-operations, respectively. Integer execution unit 224 and floating point execution unit 226 include elements such as renaming hardware, execution schedulers, arithmetic logic units (ALUs), floating point multiply and add units (in floating point execution unit 226), register files, etc. that are used for executing micro-operations or performing other operations. Micro-operations are steered or directed from dispatch 214 to integer execution unit 224 or floating point execution unit 226 based on the data types of the micro-operations, the execution unit resources to be used for executing the micro-operations, etc.

Memory subsystem 204 includes a hierarchy of cache memories, which are functional blocks that include circuitry that performs operations for storing copies of instructions and/or data nearer the functional blocks that use the instructions and/or data (than memory 104), as well as control circuits for handling accesses of the instructions and/or data. The hierarchy includes two levels, with level one (L1) instruction cache 208 and L1 data cache 228 on the first level and L2 cache 210 on the second level. Memory subsystem 204 is communicatively coupled to memory 104 and may also be coupled to an external L3 cache (not shown).

Although a particular arrangement, connectivity, and number of elements is shown in processor 102 in FIG. 2, in some embodiments, different arrangements, connectivity, and/or numbers of elements are present in processor 102.

Generally, processor 102 includes sufficient elements to perform the operations described herein.

Micro-Operation Filter and Micro-Operation Cache

Figure 3:
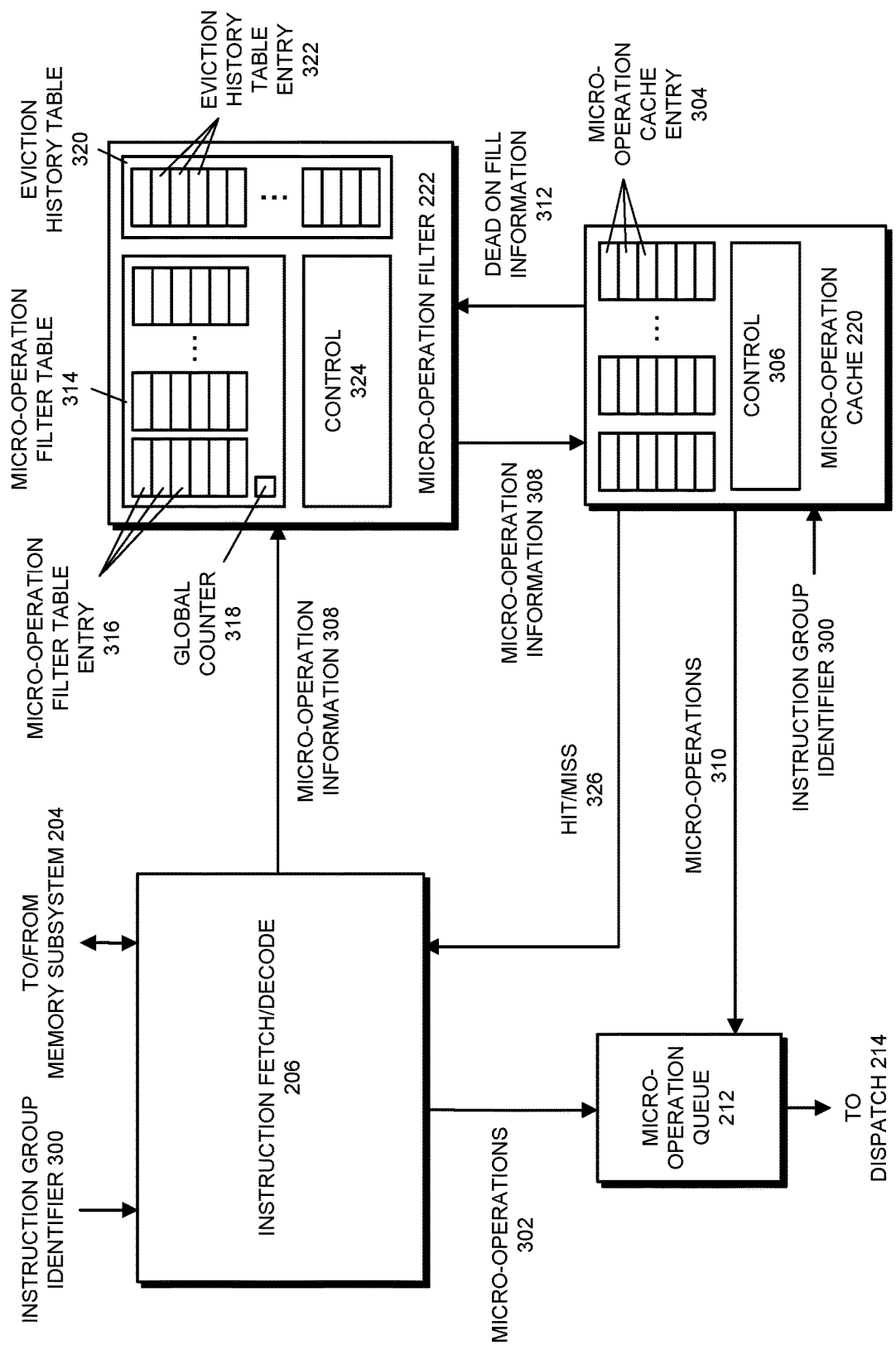
FIG. 3 presents a block diagram illustrating a micro-operation filter and a micro-operation cache in accordance with some embodiments.

In the described embodiments, a micro-operation filter performs operations for controlling whether copies of micro-operations are bypassed or stored in a micro-operation cache. FIG. 3 presents a block diagram illustrating micro-operation filter 222 and micro-operation cache 220 in accordance with some embodiments. Note that, although a particular arrangement of functional blocks is shown in FIG. 3 and operations are described as being performed by corresponding functional blocks, some embodiments use a different arrangement of functional blocks and/or some or all of the operations are performed by different functional blocks. Generally, the described embodiments include sufficient functional blocks to perform the operations herein described.

In describing the functional blocks shown in FIGS. 3-6—and elsewhere in this description—micro-operations are described as "dead on fill." Generally, dead on fill micro-operations are micro-operations that are stored or "filled" in a micro-operation cache but not accessed before being evicted from the micro-operation cache—and thus are considered "dead" with respect to their usefulness while stored in the micro-operation cache. In other words, while dead on fill micro-operations are resident in the micro-operation cache, instruction groups from which the dead on fill micro-operations were decoded are not re-executed—and no requests are therefore made to the micro-operation cache to acquire the dead on fill micro-operations. The lack of re-execution for instruction groups can happen, for example, when instruction groups are executed serially, when a subroutine in program code is executed only once, etc.

Turning now to FIG. 3, instruction fetch/decode 206, as described above, performs operations associated with fetching instructions and decoding the fetched instructions. More specifically, instruction fetch/decode 206 fetches instructions (which may be called macro-instructions, complex instructions, etc.) in instruction groups and decodes each of the instructions into one or more micro-operations. Each micro-operation is a low-level processor instruction which, when executed by an execution unit, causes the execution unit to perform a respective part of the overall operation(s) of the instruction from which that micro-operation was decoded. For example, a single RepMov instruction may be decoded by instruction fetch/decode 206 into a multiple separate micro-operations for performing a move operation dictated by the RepMov instruction on individual data elements.

During operation, instruction fetch/decode 206 receives instruction group identifier 300 from another functional block in processor 102 (e.g., next PC 216). Instruction fetch/decode 206 then fetches a corresponding instruction group from L1 instruction cache 208—or L2 cache 210 or memory 104, if necessary. Instruction fetch/decode 206 next decodes instruction(s) in the instruction group into one or more micro-operations 302 and provides micro-operations 302 to micro-operation queue 212. From micro-operation queue 212, micro-operations 302 are fed, via dispatch 214, to back end subsystem 202 for execution.

Figure 4:
FIG. 4 presents a block diagram illustrating a micro-operation cache entry in accordance with some embodiments.

Micro-operation cache 220, as described above, stores copies of micro-operations. Micro-operation cache 220 includes a number of micro-operation cache entries 304 (only a few of which are labeled for clarity), each of which includes circuitry for storing copies of micro-operations and metadata associated therewith. FIG. 4 presents a block diagram illustrating a micro-operation cache entry 304 in accordance with some embodiments. Note that, although micro-operation cache entry 304 is shown in FIG. 4 as including particular values, in some embodiments, micro-operation cache entry 304 includes different values. For example, in some embodiments, each micro-operation cache entry 304 includes only micro-operations 402—and identifier 400, accessed bit (AB) 404, and metadata (MD) 406 are stored elsewhere (e.g., in a separate tag array in micro-operation cache 220). Generally, micro-operation cache 220 includes sufficient values for performing the operations herein described.

As can be seen in FIG. 4, micro-operation cache entry 304 includes identifier 400, micro-operations 402, accessed bit 404, and metadata 406. Identifier 400 is used for storing an identifier for or associated with an instruction group for which micro-operations are stored in micro-operation cache entry 304. For example, in some embodiments, identifier 400 includes some or all of an address in memory of the instruction group or a value generated based thereon. Micro-operations 402 is used for storing micro-operations that were decoded from an instruction group. Because the number of micro-operations into which instruction groups can be decoded is variable, micro-operations 402 has capacity for storing up to M micro-operations. Accessed bit 404 is used for storing an indicator that indicates whether or not micro-operations 402 have been accessed. In some embodiments, accessed bit 404 is a single bit that is cleared (e.g., set to 0) when micro-operations 402 are stored in micro-operation cache entry 304 and set (e.g., to 1) when micro-operations 402 are subsequently accessed. Metadata 406 is used for storing metadata for micro-operation cache entry 304 such as validity information, thread identifiers, etc.

In some embodiments, micro-operation cache 220 is configured as associative, e.g., using set associativity or another form of associativity. Because micro-operation cache 220 is configured as associative, each micro-operation cache entry 304 can be used to store micro-operations decoded from instruction groups from among range or portion of different instruction groups (e.g., instruction groups located at two or more memory addresses, etc.). In other words, a given micro-operation cache entry 304 is not limited to storing micro-operations for a single instruction group. During replacement in micro-op cache 220, all micro-operations stored in the given micro-operation cache entry 304 can be evicted in order to free up the given micro-operation cache entry 304 for storing micro-operations decoded from another instruction group. In some embodiments, micro-operation cache entries 304 are evicted and otherwise handled in accordance with rules or policies such as a least-recently-used (LRU), least-used, etc.

Returning now to FIG. 3, micro-operation cache 220 also includes control 306, which includes circuitry for controlling operations of micro-operation cache 220. For example, control 306 can perform operations for storing micro-operations and associated metadata in respective micro-operation cache entries 304, selecting micro-operation cache entries 304 to free space for storing incoming micro-operations, searching micro-operation cache entries 304 to determine whether micro-operations decoded from a given instruction group are presently stored in micro-operation cache entries 304, acquiring and providing micro-operations from micro-operation cache entries 304 (e.g., to micro-operation queue 212), etc.

When performing operations for storing micro-operations and associated metadata in a micro-operation cache entry 304 as described above, control 306 receives, from micro-operation filter 222, micro-operation information 308, which includes micro-operations and metadata, such as an identifier (e.g., some or all of a memory address) for the instruction group from which the micro-operations were decoded, a thread identifier, etc. Control 306 then finds, or frees up, an available micro-operation cache entry 304 and stores the micro-operations and the metadata in the available micro-operation cache entry 304. On the other hand, when performing operations for acquiring and providing micro-operations from micro-operation cache entries 304, control 306 receives instruction group identifier 300 from another functional block in processor 102 (e.g., next PC 216), searches micro-operation cache entries 304 for a matching identifier, and, when a micro-operation cache entry 304 storing a matching identifier is found, provides micro-operations 310 to micro-operation queue 212. From micro-operation queue 212, micro-operations 310 are fed, via dispatch 214, to back end subsystem 202 for execution.

In some embodiments, as part of operations for acquiring and providing micro-operations 310 for an instruction group to micro-operation queue 212, control 306 (or another functional block) informs instruction fetch/decode 206, e.g., via hit/miss 326, when the micro-operations for the instruction group were found in a micro-operation cache entry 304 (and thus there is a "hit" in micro-operation cache 220). Instruction fetch/decode 206 then terminates operations for fetching and/or decoding the instruction group. For example, instruction fetch/decode 206 may stall or hold fetch requests for instruction groups while control 306 searches micro-operation cache entries 304 for a matching identifier and discard the stalled or held fetch requests when control 306 finds a match. As another example, instruction fetch/decode 206 may send fetch requests for instruction groups while control 306 searches micro-operation cache entries 304 for a matching identifier, but ignore or discard—and thus not decode—the fetched instruction group when control 306 finds a match. In contrast, when micro-operations for an instruction group are not found in a micro-operation cache entry 304 (and thus there is a "miss" in micro-operation cache 220), control 306 informs instruction fetch/decode 206, e.g., via hit/miss 326, that the micro-operations are not stored in micro-operation cache 220 and instruction fetch/decode 206 continues with fetching and decoding the instruction group.

Control 306 also performs operations for informing micro-operation filter 222 when micro-operations that were not accessed while stored in the micro-operation cache are evicted from micro-operation cache entries 304. In other words, upon evicting dead on fill micro-operations from a micro-operation cache entry 304, control 306 communicates dead on fill information 312, which includes at least an identifier for the instruction group from which the evicted micro-operations were decoded, to micro-operation filter 222. Micro-operation filter 222 then handles the received dead on fill information 312 as described below.

Figure 5:
FIG. 5 presents a block diagram illustrating a micro-operation filter table entry in accordance with some embodiments.

Micro-operation filter 222, as described above, controls which micro-operations are stored in micro-operation cache 220. Micro-operation filter 222 includes micro-operation filter table 314 for storing information that is used for controlling which micro-operations are stored in micro-operation cache 220. Micro-operation filter table 314 includes a number of micro-operation filter table entries 316 (only a few of which are labeled for clarity), each of which includes circuitry for storing information about instruction groups that are predicted dead on fill, the information to be used for bypassing corresponding micro-operations (i.e., preventing the corresponding micro-operations from being stored in micro-operation cache 220). FIG. 5 presents a block diagram illustrating a micro-operation filter table entry 316 in accordance with some embodiments. Note that, although micro-operation filter table entry 316 is shown in FIG. 5 as including a particular arrangement of values, in some embodiments, micro-operation filter table entry 316 includes different values. Generally, each micro-operation filter table entry 316 includes sufficient values for performing the operations herein described.

As can be seen in FIG. 5, micro-operation filter table entry 316 includes identifier 500, local counter (LC) 502, and metadata (MD) 504. Identifier 500 is used for storing an identifier for or associated with an instruction group for which micro-operations are predicted to be dead on fill in micro-operation cache 220. For example, in some embodiments, identifier 500 includes some or all of an address in memory of the instruction group. Local counter 502 is used for storing a counter for the micro-operation filter table entry 316. Local counter 502 is used for controlling how many times information from micro-operation filter table entry 316 is used for bypassing micro-operations before being discarded as being stale—and thus less likely to be correct. Metadata 504 is used for storing metadata for micro-operation filter table entry 316 such as validity information, thread identifiers, and other information.

Returning now to FIG. 3, micro-operation filter table 314 also includes global counter 318. Global counter 318 is used for storing a global counter associated with micro-operation filter table entries 316. Global counter 318 is used for controlling how many times information from all of micro-operation filter table entries 316 as a group is used before the information from all of the micro-operation filter table entries 316 as a group is discarded as being stale—and thus less likely to be correct.

Figure 6:
FIG. 6 presents a block diagram illustrating an eviction history table entry in accordance with some embodiments.

Micro-operation filter 222 also includes eviction history table 320 for storing information that is used for determining which instruction groups are added to micro-operation filter table 314. Eviction history table 320 includes eviction history table entries 322 (only a few of which are labeled for clarity), each of which includes circuitry for storing identifiers of instruction groups for which micro-operations were dead on fill in micro-operation cache 220, as well as storing a counter that is used for determining which instruction groups are added to micro-operation filter table 314. FIG. 6 presents a block diagram illustrating an eviction history table entry 322 in accordance with some embodiments. Note that, although eviction history table entry 322 is shown in FIG. 6 as including a particular arrangement of values, in some embodiments, eviction history table entry 322 includes different values. Generally, each eviction history table entry 322 includes sufficient values for performing the operations herein described.

As can be seen in FIG. 6, eviction history table entry 322 includes identifier 600, confidence counter (CC) 602, and metadata (MD) 604. Identifier 600 is used for storing an identifier for or associated with an instruction group for which micro-operations were dead on fill in micro-operation cache 220. For example, in some embodiments, identifier 500 includes a tag or other value that is generated from or based on some or all of an address in memory of the instruction group. Confidence counter 602 is used for storing a counter in which is kept a count of a number of times that micro-operations decoded from the instruction group identified by identifier 600 were dead on fill in micro-operation cache 220. Metadata 604 is used for storing metadata for eviction history table entry 322 such as validity information, thread identifiers, and other information.

In some embodiments, eviction history table 320 is configured as associative, e.g., using set associativity or another form of associativity. Because eviction history table 320 is configured as associative, each eviction history table entry 322 can be used to store identifiers for dead on fill instruction groups from among range or portion of different instruction groups (e.g., instruction groups located at two or more different memory addresses, etc.). In other words, a given eviction history table entry 322 is not limited to storing an identifier for a single instruction group. During replacement in eviction history table 320, an existing identifier for a dead on fill instruction group stored in the given eviction history table entry 322 can be evicted in order to free up the given eviction history table entry 322 for storing an identifier for another dead on fill instruction group. In some embodiments, eviction history table entries 322 are evicted and otherwise handled in accordance with rules or policies such as a least-recently-used (LRU), least-used, etc. In some embodiments, the associativity, e.g., the arrangement of ways and sets, etc., for eviction history table 320 is similar to that used for micro-operation cache 220, which can help when storing dead on fill information 312 from micro-operation cache 220 in eviction history table 320.

Returning to FIG. 3, micro-operation filter 222 also includes control 324, which includes circuitry for controlling/managing operations of micro-operation filter 222. For example, control 324 can perform operations for receiving, from micro-operation cache 220, dead on fill information 312, updating eviction history table 320 based on dead on fill information 312, updating micro-operation filter table 314 based on and using information from eviction history table 320, bypassing micro-operations for instruction groups based on information in micro-operation filter table 314, updating local counters 502 in micro-operation filter table entries 316 and using local counters 502 for invalidating information in corresponding micro-operation filter table entries 316, updating global counter 318 and using global counter 318 for invalidating information in micro-operation filter table entries 316, etc.

In some embodiments, when updating micro-operation filter table 314 based on and using information from eviction history table 320 as described above, control 324 performs a number of operations. In other words, the process of control 324 adding identifiers of instruction groups for which the micro-operations are predicted dead on fill to micro-operation filter table 314 is a multi-step process. For the first step, micro-operation cache 220 provides, to control 324, dead on fill information 312 about a given instruction group for which the micro-operations were found to be dead on fill in micro-operation cache 220. For the second step, control 324 uses the received dead on fill information 312 to update an eviction history table entry 322 with an identifier of the given instruction group. Updating the eviction history table entry 322 may mean updating an existing eviction history table entry 322 or newly adding information to an available eviction history table entry 322. In either case, the updating includes updating a confidence counter 602 for the eviction history table entry 322 to indicate a number of times that the micro-operations decoded from the instruction group were found to be dead on fill in micro-operation cache 220. For the third step, when updating the confidence counter 602 for the eviction history table entry 322 causes the confidence counter 602 to exceed a threshold value, control 324 adds information about the instruction group to a micro-operation filter table entry 316. As described in more detail below, information in micro-operation filter table entries 316 is used for bypassing micro-operations. By adding the information to a micro-operation filter table entry 316, therefore, control 324 is configuring itself to bypass future instances of the micro-operations decoded from the instruction group. In essence, based on the micro-operations previously being dead on fill in micro-operation cache 220 a specified number of times—as counted in an eviction history table entry 322—control 324 makes a prediction that the micro-operations will continue to be dead on fill in the micro-operation cache 220 for future instances of the instruction group.

In some embodiments, when bypassing micro-operations for instruction groups based on information in micro-operation filter table 314, control 324 receives, from instruction fetch/decode 206, micro-operation information 308 for a given instruction group. Control 324 then searches micro-operation filter table 314 for a match between an identifier 500 in a micro-operation filter table entry 316 and an identifier for the given instruction group from micro-operation information 308. When a match is found, control 324 bypasses the micro-operations by preventing copies of the micro-operations from being stored in a micro-operation cache entry 304—i.e., discarding or ignoring the micro-operations received from instruction fetch/decode 206. On the other hand, when no match is found, control 324 does not bypass the micro-operations. In this case, control 324 provides micro-operation information 308 to micro-operation cache 220, which stores a copy of the micro-operations, an identifier for the instruction group, and possibly metadata from micro-operation information 308 in an available micro-operation cache entry 304 (which can mean evicting existing information from the micro-operation cache entry 304). Note that, regardless of the outcome of the search and bypass operations of control 324, instruction fetch/decode 206 forwards the micro-operations 302 to micro-operation queue 212 in preparation for dispatch to back end subsystem 202 for execution.

In some embodiments, for using local counters 502 for invalidating information in corresponding micro-operation filter table entries 316, when control 324 initially stores an identifier for an instruction group (and possibly other information) to a given micro-operation filter table entry 316, control 324 sets local counter 502 for the given micro-operation filter table entry 316 to a specified local counter value (e.g., 5, 10 or another value). Control 324 then decrements local counter 502 for the given micro-operation filter table entry 316 each time that micro-operations are bypassed because the identifier for the instruction group was found in the given micro-operation filter table entry 316. Control 324 next invalidates the given micro-operation filter table entry 316 when the local counter reaches zero, rendering the information stored therein unusable. For example, for invalidating the given micro-operation filter table entry 316, control 324 can set a valid bit in metadata 504 for the given micro-operation filter table entry 316 to indicate that the given micro-operation filter table entry 316 is not presently valid. By setting and decrementing local counter 502 for the given micro-operation filter table entry 316 and eventually invalidating the given micro-operation filter table entry 316 based on the value of local counter 502, control 324 limits the number of times for which information from the given micro-operation filter table entry 316 is used for bypassing micro-operations, which can help to avoid stale information being used for (possibly incorrectly) bypassing micro-operations.

In some embodiments, for using global counter 318 for invalidating information in micro-operation filter table entries 316, control 324 initially sets global counter 318 to zero. For example, control 324 may set global counter 318 to zero at startup, after all of micro-operation filter table entries 316 are invalidated, etc. Control 324 then increments global counter 318 each time that micro-operations are bypassed because an identifier for an instruction group was found in any micro-operation filter table entry 316. Control 324 next invalidates all of the micro-operation filter table entries 316 when the global counter exceeds a reset threshold value (e.g., 40, 55, or another value). For example, for invalidating all of the micro-operation filter table entries 316, control 324 can set a valid bit in metadata 504 for each of the micro-operation filter table entries 316 to indicate that that micro-operation filter table entry 316 is not presently valid. By setting and incrementing global counter 318 and eventually invalidating all of the micro-operation filter table entries 316 based on the value of global counter 318, control 324 limits the number of times for which information from the micro-operation filter table 314 as a whole is used for bypassing micro-operations, which can help to avoid stale information being used for bypassing the micro-operations.

Predictions and Mispredictions

In the described embodiments, a micro-operation filter (e.g., micro-operation filter 222), based on information about micro-operations for instruction groups having been dead on fill in a micro-operation cache (e.g., micro-operation cache 220), makes predictions whether subsequent instances of micro-operations for the instruction groups will be dead on fill in the micro-operation cache. The micro-operation filter makes the "predictions" by adding identifiers for instruction groups to the micro-operation filter table, from where the identifiers will be used to bypass subsequent micro-operations decoded from the instruction groups. The predictions made by the micro-operation filter are assumptions of/guesses about future micro-operation access behavior that are based on prior micro-operation access behavior. It is possible that the predictions are incorrect—and thus that micro-operations that are predicted dead on fill would have been accessed in the micro-operation cache. Should the actual behavior differ from the predicted behavior, however, although a performance penalty is incurred for re-fetching and re-decoding micro-operations that were bypassed (and thus not stored and available in the micro-operation cache), the operation of the micro-operation cache and the processor is correct.

In some embodiments, the thresholds and values for the confidence counters, local counters, and/or global counter are set to values that assist in usefully bypassing dead on fill micro-operations while also avoiding mispredictions of dead on fill micro-operations. For example, the local counters and global counter and/or the thresholds for the local counters and/or global counter can be set to respective values so that useful entries are retained in the micro-operation filter table for a reasonable amount of time, but older/stale entries are removed from the micro-operation filter table before the likelihood of mispredictions becomes unacceptably high. The respective values for the confidence counters, local counters, and/or global counter can be determined experimentally, computed, estimated, or otherwise generated.

Process for Handling Micro-Operations

Figure 7:
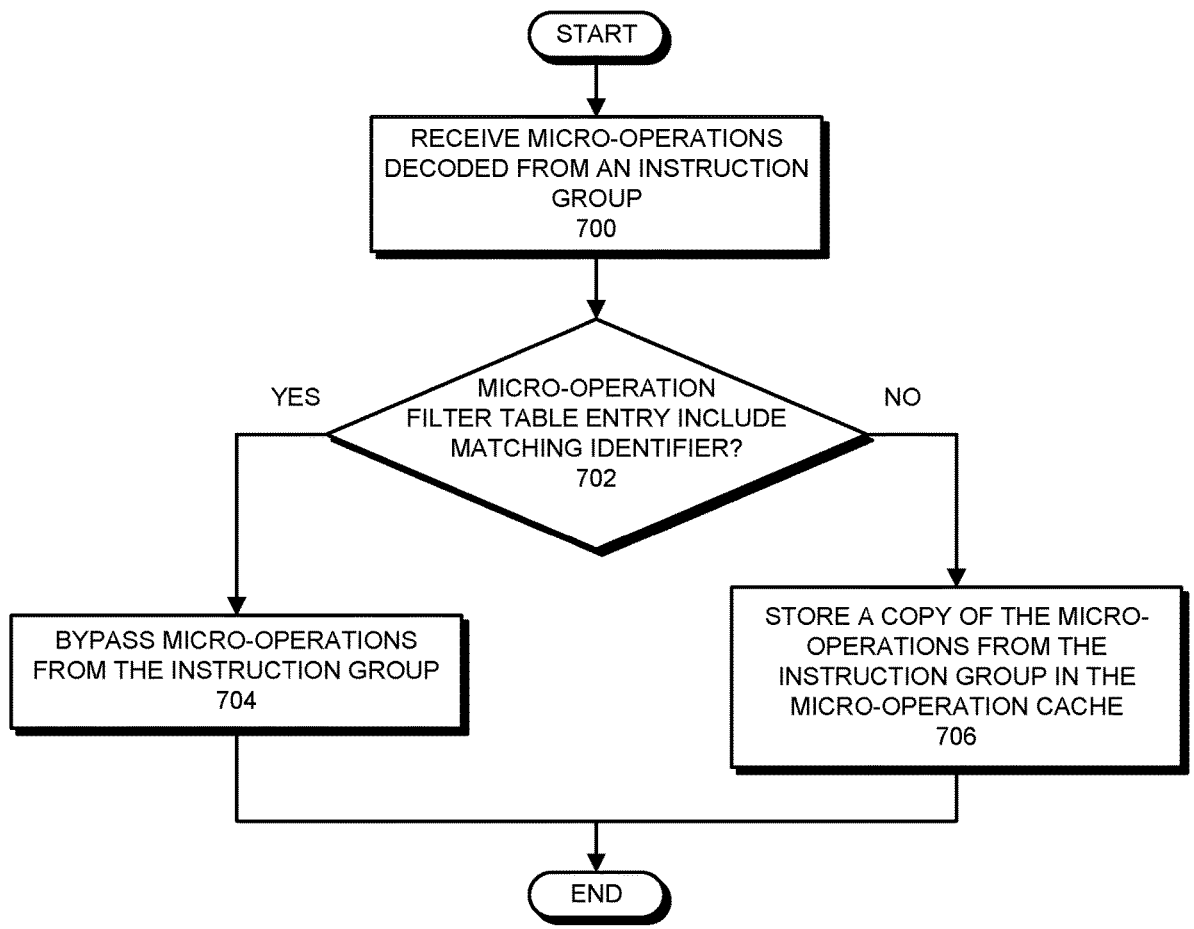
FIG. 7 presents a flowchart illustrating a process for bypassing micro-operations in accordance with some embodiments.

In the described embodiments, a micro-operation filter (e.g., micro-operation filter 222) performs operations for bypassing micro-operations received from an instruction fetch/decode unit (e.g., instruction fetch/decode 206)—and thus not storing copies of the micro-operations in a micro-operation cache (e.g., micro-operation cache 220). FIG. 7 presents a flowchart illustrating a process for bypassing micro-operations in accordance with some embodiments.

Note that the operations shown in FIG. 7 are presented as a general example of operations performed by some embodiments. The operations performed by other embodiments include different operations, operations that are performed in a different order, and/or operations that are performed by different entities or functional blocks.

The operations in FIG. 7 start when the micro-operation filter receives, from an instruction fetch/decode unit, micro-operations decoded from an instruction group (step 700). For this operation, the instruction fetch/decode unit, based on an instruction group identifier received from a next program counter functional block (e.g., next PC 216) or another entity, fetches an instruction group from an L1 instruction cache (e.g., L1 instruction cache 208) or elsewhere in a memory subsystem (e.g., memory subsystem 204). The instruction fetch/decode unit then decodes instructions in the instruction group into micro-operations. Along with forwarding the micro-operations to a back end subsystem (e.g., back end subsystem 202) for execution, the instruction fetch/decode unit sends micro-operation information (e.g., micro-operation information 308) to the micro-operation filter.

The micro-operation filter then determines if a micro-operation filter table entry (e.g., one of micro-operation filter table entries 316) includes a matching identifier (step 702). For this operation, the micro-operation filter acquires an identifier for the instruction group from the received micro-operation information. The micro-operation filter then compares the identifier from the instruction group with identifiers in any valid micro-operation filter table entries to determine if there is a micro-operation filter table entry that includes a matching identifier.

When a micro-operation filter table entry includes a matching identifier (step 702), the micro-operation filter bypasses micro-operations from the instruction group (step 704). For this operation, the micro-operation filter determines that the micro-operations are predicted dead on fill based on the presence of a matching identifier in a micro-operation filter table entry. The micro-operation filter then discards (e.g., deletes, ignores, etc.) the micro-operation information—and does not store a copy of the micro-operation information in the micro-operation cache. In contrast, when the micro-operation filter table does not include a matching identifier (step 702), the micro-operation filter stores a copy of the micro-operations from the instruction group in the micro-operation cache (step 706). For this operation, the micro-operation filter determines that the micro-operations are not predicted dead on fill because no micro-operation filter table entry with a matching identifier is found in the micro-operation filter table. The micro-operation filter then causes the micro-operation cache to store a copy of the micro-operation information in a micro-operation cache entry.

Process for Updating Entries in a Micro-Operation Filter Table

Figure 8:
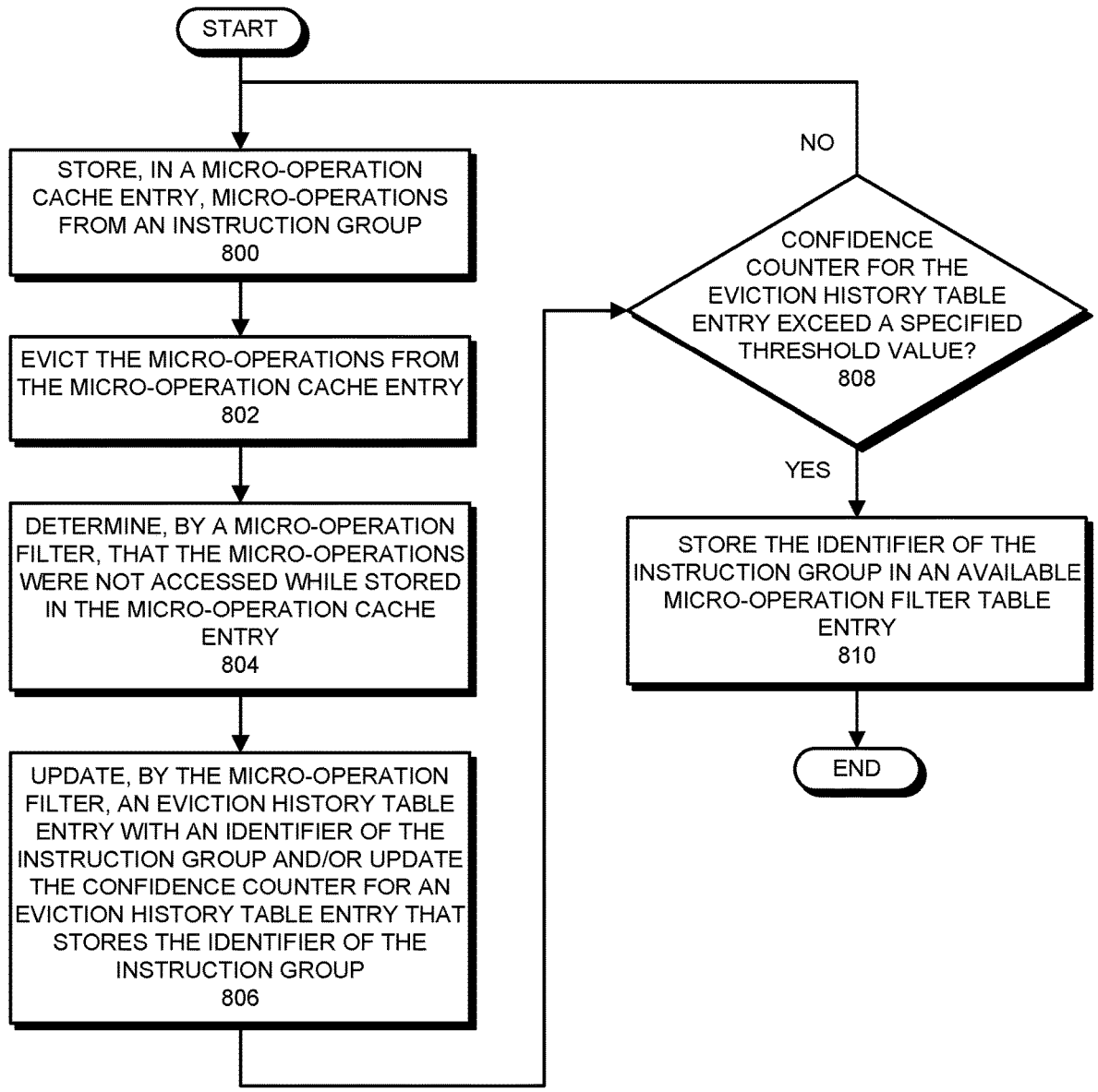
FIG. 8 presents a flowchart illustrating a process for updating entries in a micro-operation filter table in accordance with some embodiments.

In the described embodiments, a micro-operation filter (e.g., micro-operation filter 222) performs operations for updating entries in a micro-operation filter table (e.g., micro-operation filter table 314) to be used for bypassing micro-operations. FIG. 8 presents a flowchart illustrating a process for updating entries in a micro-operation filter table in accordance with some embodiments. Note that the operations shown in FIG. 8 are presented as a general example of operations performed by some embodiments. The operations performed by other embodiments include different operations, operations that are performed in a different order, and/or operations that are performed by different entities or functional blocks.

The operations in FIG. 8 start when micro-operations decoded from an instruction group are stored in a micro-operation cache entry in a micro-operation cache (step 800). For this operation, micro-operation information (e.g. micro-operation information 308) is received by the micro-operation cache (e.g., micro-operation cache 220) from the micro-operation filter. The micro-operation cache then stores the micro-operations in an available micro-operation cache entry (e.g., a micro-operation cache entry 304). In some embodiments, this may mean evicting existing micro-operations from a micro-operation cache entry to free up an available micro-operation cache entry. Note that step 800 is an example of micro-operations not being bypassed by the micro-operation filter as described above for steps 702-704—but instead being stored in the micro-operation cache as described above for steps 702 and 706.

The micro-operations are then evicted from the micro-operation cache entry (step 802). For this operation, the micro-operation cache can evict the micro-operations in order to free a micro-operation cache entry for storing micro-operations from another instruction group or for another reason. When evicting the micro-operations from the micro-operation cache entry, the micro-operation cache determines, e.g., using an accessed bit (e.g., accessed bit 404), that the micro-operations were not accessed while stored in the micro-operation cache entry—and thus were dead on fill. The micro-operation cache therefore communicates dead on fill information (e.g., dead on fill information 312) to the micro-operation filter to inform the micro-operation filter that the micro-operations were dead on fill.

The micro-operation filter next determines, based on the dead on fill information received from the micro-operation cache, that the micro-operations were not accessed while stored in the micro-operation cache entry (step 804). The micro-operation filter, upon determining that the micro-operations were dead on fill, updates an eviction history table entry (e.g., an eviction history table entry 322) with an identifier of the instruction group and/or updates the confidence counter for an eviction history table entry that stores the identifier of the instruction group (step 806). For this operation, when an eviction history table entry already includes the identifier for the instruction group—and thus the micro-operations for the instruction group were earlier found to be dead on fill in the micro-operation cache at least once—the micro-operation filter simply updates (e.g., increments, increases, etc.) a confidence counter for that eviction history table entry. On the other hand, when no eviction history table entry includes the identifier for the instruction group, the micro-operation filter finds an available eviction history table entry, adds the identifier to the available eviction history table entry, and sets a confidence counter for the eviction history table to an initial value (e.g., 1). In some embodiments, finding the available eviction history table entry means evicting existing information from an eviction history table entry to free up an available eviction history table entry.

When updating the confidence counter for the eviction history table entry does not cause the eviction history table entry to exceed a threshold value (step 808), the micro-operation filter continues operation without making changes to the micro-operation filter table. In contrast, when updating the confidence counter for the eviction history table entry causes the eviction history table entry to exceed a threshold value (step 808), the micro-operation filter stores the identifier of the instruction group in an available micro-operation filter table entry (step 810). For this operation, the micro-operation filter, upon a sufficient number of instances of the micro-operations having been found to be dead on fill in the micro-operation cache—and thus causing the micro-operation filter to update the confidence counter for an eviction history table entry as in step 806—updates an entry in the micro-operation filter table. As described above, because the micro-operation filter table entry will be used for bypassing micro-operations for the instruction group, this operation amounts to a prediction that future instances of the micro-operations will be dead on fill in the micro-operation cache.

Process for Invalidating Micro-Operation Filter Table Entries

Figure 9:
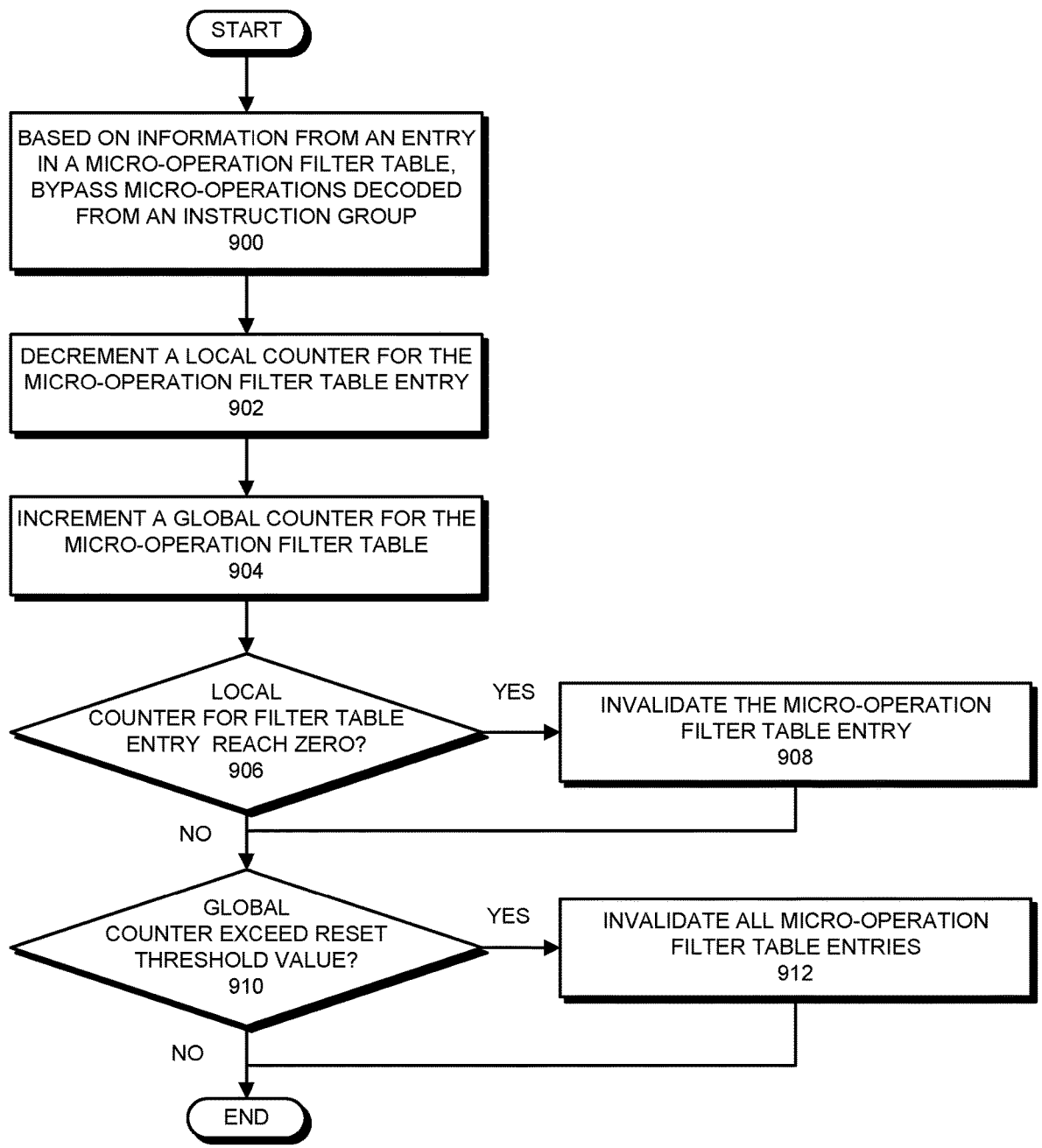
FIG. 9 presents a flowchart illustrating a process for invalidating information in entries in a micro-operation filter table in accordance with some embodiments.

In the described embodiments, a micro-operation filter (e.g., micro-operation filter 222) performs operations for invalidating information in micro-operation filter table entries (e.g., micro-operation filter table entries 316) in order to remove stale information from the micro-operation filter table. FIG. 9 presents a flowchart illustrating a process for invalidating information in entries in a micro-operation filter table in accordance with some embodiments. Note that the operations shown in FIG. 9 are presented as a general example of operations performed by some embodiments. The operations performed by other embodiments include different operations, operations that are performed in a different order, and/or operations that are performed by different entities or functional blocks.

For the operations in FIG. 9, it is assumed that an entry in a micro-operation filter table has had information (e.g., identifier 500 and metadata 504) for an instruction group stored therein. For example, the operations of FIG. 8 including step 810 may have been performed at some point in the past. Also, a local counter (e.g., local counter 502) for the micro-operation filter table entry was set to an initial value when the information for the instruction group was stored therein. In addition, the global counter was previously reset/set to zero at a time when all of the entries in the micro-operation filter table were invalid, such as at startup or after a prior invalidation of all the micro-operation filter table entries.

The operations in FIG. 9 start when, based on information in a micro-operation filter table entry, the micro-operation filter bypasses micro-operations from an instruction group (step 900). For this operation, the micro-operation filter performs operations similar to those shown in steps 700-704 of FIG. 7—and thus the micro-operations are not stored in an entry in a micro-operation cache (e.g., micro-operation cache 220), but instead are ignored or discarded by the micro-operation filter.

Because the information in the micro-operation filter table entry was used for bypassing the micro-operations, the micro-operation filter decrements a local counter (e.g., local counter 502) for the micro-operation filter table entry (step 902). For this operation, the micro-operation filter reduces the local counter for the entry that tracks how many times that the entry has been used for bypassing micro-operations. Because the information in the micro-operation filter table entry was used for bypassing the micro-operations, the micro-operation filter also increments a global counter (e.g., global counter 318) for the micro-operation filter table (step 904). For this operation, the micro-operation filter increases the global counter for the micro-operation filter table that tracks how many times that any micro-operation filter table entry has been used for bypassing micro-operations.

Note that, although decrementing and incrementing are used in describing some embodiments in steps 902 and 904, respectively, in some embodiments, the micro-operation filter uses different values for the local counters and/or the global counter—and makes corresponding different adjustments to the local counters and/or the global counter (e.g., increases, decreases, etc.). Generally, in the described embodiments, the micro-operation filter includes mechanisms for keeping track of the use of the individual micro-operation filter table entries as well as the use of the micro-operation filter table entries as a group/whole.

If decrementing the local counter causes the local counter to reach zero (step 906), the micro-operation filter invalidates the micro-operation filter table entry (step 908). For this operation, the micro-operation filter sets a valid bit in metadata (e.g., metadata 504) for the micro-operation filter table entry to indicate that the micro-operation filter table entry is invalid, clears/removes all information from the micro-operation filter table entry, and/or otherwise renders the information in the micro-operation filter table entry unusable for subsequently bypassing micro-operations. Otherwise, when the local counter has not reached zero (step 906), the micro-operation filter proceeds with step 910 (i.e., without invalidating the micro-operation filter table entry).

If incrementing the global counter causes the global counter to exceed a reset threshold value (step 910), the micro-operation filter table invalidates all of the micro-operation filter table entries as a group (step 912). For this operation, the micro-operation filter sets a valid bit in metadata (e.g., metadata 504) for each micro-operation filter table entry to indicate that that micro-operation filter table entry is invalid, clears/removes all information from all of the micro-operation filter table entries, and/or otherwise renders all the information in the micro-operation filter table unusable for subsequently bypassing micro-operations. Otherwise, when the global counter has not exceeded the reset threshold value (step 910), the micro-operation filter proceeds with subsequent operations (i.e., without invalidating all of the micro-operation filter table entries).

Threads

In some embodiments, the processor includes circuitry, or "contexts," for supporting two or more (and possibly many more) execution threads. The processor can therefore maintain state for and execute program code instructions using each of the two or more execution threads. In some embodiments, the processor performs operations similar to those described above for bypassing dead on fill micro-operations for each thread. In some of these embodiments, multiple threads can share the micro-operation filter table and eviction history table. In these embodiments, therefore, predictions of non-access of micro-operations stored in the micro-operation cache, and bypassing micro-operations based thereon, may be done for a given thread based wholly or partially on the past behavior of another thread. In others of these embodiments, each thread can have its own micro-operation filter table and/or eviction history table—or exclusive access to some portion of a shared micro-operation filter table and eviction history table. In these embodiments, predictions of non-access of micro-operations stored in the micro-operation cache, and bypassing micro-operations based thereon, may be done for a given thread based wholly on the past behavior of the given thread.

In some embodiments, at least one electronic device (e.g., electronic device 100) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
   a processor;
   a micro-operation cache in the processor, the micro-operation cache including a plurality of micro-operation cache entries, each micro-operation cache entry configured for storing micro-operations decoded from instruction groups of one or more instructions; and
   a micro-operation filter in the processor, the micro-operation filter including a plurality of micro-operation filter table entries, one or more of the micro-operation filter table entries storing identifiers of instruction groups for which the micro-operations are predicted not to be accessed if stored in the micro-operation cache based on the micro-operations having been previously evicted from the micro-operation cache without having been accessed while stored in the micro-operation cache;
   wherein the micro-operation filter is configured to:
      receive a first identifier for a first instruction group; and
      prevent a copy of the micro-operations from the first instruction group from being stored in the micro-operation cache when a micro-operation filter table entry includes an identifier that matches the first identifier.

2. The electronic device of claim 1, wherein the micro-operation filter is further configured to:
   receive a second identifier for a second instruction group; and
   cache micro-operations from the second instruction group in the micro-operation cache when none of the micro-operation filter table entries include an identifier that matches the second identifier.

3. The electronic device of claim 1, further comprising:
   an eviction history table in the processor, the eviction history table including a plurality of eviction history table entries, each eviction history table entry configured for storing identifiers of instruction groups for which the micro-operations were not accessed while being stored in the micro-operation cache;
   wherein the micro-operation filter is further configured to:
      when given micro-operations from a given instruction group are evicted from a micro-operation cache entry, determine that the given micro-operations were not accessed while stored in the micro-operation cache;
      updating at least one of an eviction history table entry with an identifier of the given instruction group and a confidence counter for an eviction history table entry that stores the identifier of the given instruction group; and
      when the confidence counter for the eviction history table entry that stores the identifier of the given instruction group exceeds a confidence counter threshold value, storing the identifier of the given instruction group in an available micro-operation filter table entry.

4. The electronic device of claim 3, wherein, when updating the at least one of the eviction history table entry with the identifier of the given instruction group and the confidence counter for the eviction history table entry that stores the identifier of the given instruction group, the micro-operation filter is configured to:
   when the eviction history table does not already include an eviction history table entry with the identifier of the given instruction group,
      updating an available eviction history table entry with the identifier of the given instruction group, and
      setting a confidence counter for the eviction history table entry that stores the identifier of the given instruction group to an initial value; and
   when the eviction history table already includes an eviction history table entry with the identifier of the given instruction group,
      incrementing a confidence counter for the eviction history table entry that stores the identifier of the given instruction group.

5. The electronic device of claim 3, further comprising:
   an accessed indicator for each micro-operation cache entry, wherein:
      the micro-operation cache is configured to:
         set an accessed indicator for a given micro-operation cache entry when micro-operations stored therein are accessed; and
         use a respective accessed indicator to determine whether the micro-operations were accessed while stored in the given micro-operation cache entry.

6. The electronic device of claim 3, wherein updating an available eviction history table entry includes finding, and possibly evicting an existing identifier from, an eviction history table entry in a corresponding set based on the identifier of the given instruction group.

7. The electronic device of claim 3, further comprising:
   a local counter for each micro-operation filter table entry, wherein the micro-operation filter is configured to:
      set the local counter to a local counter value when an identifier for an instruction group is stored in a given micro-operation filter table entry;
      decrement the local counter each time that micro-operations from the instruction group are prevented from being stored in the micro-operation cache based on the identifier in the given micro-operation filter table entry; and
      invalidate the given micro-operation filter table entry when the local counter reaches zero.

8. The electronic device of claim 3, further comprising:
   a global counter for the micro-operation filter, wherein the micro-operation filter is configured to:

set the global counter to zero while all micro-operation filter table entries are invalid prior to storing identifiers for instruction groups in the micro-operation filter table entries;

increment the global counter each time that micro-operations from any instruction group are prevented from being stored in the micro-operation cache based on the identifier in a respective micro-operation filter table entry; and invalidate all micro-operation filter table entries when a value of the global counter exceeds a reset threshold value.

9. The electronic device of claim 3, further comprising: one or more thread contexts in the processor, wherein each thread context is configured to:

use at least one of a separate portion of the micro-operation filter table entries and a separate portion of the eviction history table entries; or use at least one of a separate thread-specific micro-operation filter and a separate thread-specific eviction history table.

10. The electronic device of claim 1, further comprising: a memory in which instruction groups are stored, wherein the identifier of each instruction group is a tag that includes some or all of an address in the memory associated with that instruction group or a value computed based on the address in the memory.

11. A method for handling micro-operations in an electronic device that includes a processor; a micro-operation cache in the processor that includes a plurality of micro-operation cache entries, each micro-operation cache entry configured for storing micro-operations decoded from instruction groups of one or more instructions; and a micro-operation filter in the processor that includes a plurality of micro-operation filter table entries, one or more of the micro-operation filter table entries storing identifiers of instruction groups for which the micro-operations are predicted not to be accessed if stored in the micro-operation cache based on the micro-operations having been previously evicted from the micro-operation cache without having been accessed while stored in the micro-operation cache, the method comprising:

receiving, by the micro-operation filter, a first identifier for a first instruction group; and preventing, by the micro-operation filter, a copy of the micro-operations from the first instruction group from being stored in the micro-operation cache when a micro-operation filter table entry includes an identifier that matches the first identifier.

12. The method of claim 11, wherein the method further comprises:

receiving, by the micro-operation filter, a second identifier for a second instruction group; and caching, by the micro-operation filter, micro-operations from the second instruction group in the micro-operation cache when none of the micro-operation filter table entries include an identifier that matches the second identifier.

13. The method of claim 11, wherein:

the processor comprises an eviction history table that includes a plurality of eviction history table entries, each eviction history table entry configured for storing identifiers of instruction groups for which the micro-operations were not accessed while being stored in the micro-operation cache; and the method further comprises:

when given micro-operations from a given instruction group are evicted from a micro-operation cache entry, determining, by the micro-operation filter, that the given micro-operations were not accessed while stored in the micro-operation cache;

updating, by the micro-operation filter, at least one of an eviction history table entry with an identifier of the given instruction group and a confidence counter for an eviction history table entry that stores the identifier of the given instruction group; and when the confidence counter for the eviction history table entry that stores the identifier of the given instruction group exceeds a confidence counter threshold value, storing, by the micro-operation filter, the identifier of the given instruction group in an available micro-operation filter table entry.

14. The method of claim 13, wherein updating the at least one of the eviction history table entry with the identifier of the given instruction group and the confidence counter for the eviction history table entry that stores the identifier of the given instruction group comprises:

when the eviction history table does not already include an eviction history table entry with the identifier of the given instruction group, updating, by the micro-operation filter, an available eviction history table entry with the identifier of the given instruction group, and setting, by the micro-operation filter, a confidence counter for the eviction history table entry that stores the identifier of the given instruction group to an initial value; and when the eviction history table already includes an eviction history table entry with the identifier of the given instruction group, incrementing, by the micro-operation filter, a confidence counter for the eviction history table entry that stores the identifier of the given instruction group.

15. The method of claim 13, wherein:

each micro-operation cache entry includes an accessed indicator; and the method further comprises:

setting, by the micro-operation cache, an accessed indicator for a given micro-operation cache entry when micro-operations stored therein are accessed; and using, by the micro-operation cache, a respective accessed indicator to determine whether the micro-operations were accessed while stored in the given micro-operation cache entry.

16. The method of claim 13, wherein updating an available eviction history table entry includes finding, and possibly evicting an existing identifier from, an eviction history table entry in a corresponding set based on the identifier of the given instruction group.

17. The method of claim 13, wherein:

each micro-operation filter table entry includes a local counter; and the method further comprises:

setting, by the micro-operation filter, the local counter to a local counter value when an identifier for an instruction group is stored in a given micro-operation filter table entry;

decrementing, by the micro-operation filter, the local counter each time that micro-operations from the instruction group are prevented from being stored in the micro-operation cache based on the identifier in the given micro-operation filter table entry; and invalidating, by the micro-operation filter, the given micro-operation filter table entry when the local counter reaches zero.

18. The method of claim 13, wherein:

the micro-operation filter includes a global counter; and
the method further comprises:

setting, by the micro-operation filter, the global counter to zero while all micro-operation filter table entries are invalid prior to storing identifiers for instruction groups in the micro-operation filter table entries;

incrementing, by the micro-operation filter, the global counter each time that micro-operations from any instruction group are prevented from being stored in the micro-operation cache based on the identifier in a respective micro-operation filter table entry; and invalidating, by the micro-operation filter, all micro-operation filter table entries when a value of the global counter exceeds a reset threshold value.

19. The method of claim 13, wherein:

the processor includes multiple thread contexts, each thread context providing support for one thread of execution; and the method further comprises:

using, by each thread context, at least one of a separate portion of the micro-operation filter table entries and a separate portion of the eviction history table entries; or using, by each thread context, at least one of a separate thread-specific micro-operation filter and a separate thread-specific eviction history table.

20. The method of claim 11, wherein:

the electronic device includes a memory in which instruction groups are stored; and the identifier of each instruction group is a tag that includes some or all of an address in the memory associated with that instruction group or a value computed based on the address in the memory.

\* \* \* \* \*